United States Patent
Minborg et al.

(10) Patent No.: US 8,027,443 B2
(45) Date of Patent: Sep. 27, 2011

(54) METHOD AND APPARATUS FOR EXCHANGE OF DATA OBJECTS BETWEEN NETWORK NODES DEPENDING ON TERMINAL CAPABILITY

(75) Inventors: Per-Åke Minborg, Stora Höga (SE); Timo Pojanvuori, Hovås (SE)

(73) Assignee: Sony Ericsson Mobile Communications AB, Lund (SE)

( * ) Notice: Subject to any disclaimer, the term of this patent is extended or adjusted under 35 U.S.C. 154(b) by 2077 days.

(21) Appl. No.: 10/776,500

(22) Filed: Feb. 12, 2004

(65) Prior Publication Data

US 2004/0205170 A1    Oct. 14, 2004

(30) Foreign Application Priority Data

Aug. 15, 2001  (SE) ..................... 0102729
Jul. 19, 2002  (WO) ............... PCT/SE02/01397

(51) Int. Cl.
*H04M 3/42* (2006.01)
(52) U.S. Cl. ............ 379/201.01; 379/88.17; 379/93.01; 709/217; 709/229; 709/227
(58) Field of Classification Search ............ 370/260, 370/352; 455/412.1; 379/207.02, 204.01, 379/201.12, 69, 70, 88.12, 88.2, 88.21, 142.06, 379/93.23, 201.01, 93.01, 88.17; 709/206, 709/220, 227, 217, 219, 229
See application file for complete search history.

(56) References Cited

U.S. PATENT DOCUMENTS

| | | |
|---|---|---|
| 5,157,710 A | 10/1992 | Itoh |
| 5,289,530 A | 2/1994 | Reese |
| 5,305,372 A | 4/1994 | Tomiyori |
| 5,329,591 A | 7/1994 | Magrill |
| 5,398,279 A | 3/1995 | Frain |
| 5,533,922 A | 7/1996 | Yamaharu |
| 5,561,704 A | 10/1996 | Salimando |
| 5,588,042 A | 12/1996 | Comer |
| 5,613,205 A | 3/1997 | Dufour |
| 5,689,563 A | 11/1997 | Brown et al. |
| 5,708,702 A | 1/1998 | De Paul et al. |
| 5,712,979 A | 1/1998 | Graber et al. |
| 5,757,894 A | 5/1998 | Kay et al. |
| 5,761,279 A | 6/1998 | Bierman et al. |

(Continued)

FOREIGN PATENT DOCUMENTS

DE    19737126    3/1999

(Continued)

OTHER PUBLICATIONS

Huitema C. et al., IEEE Xplore, "An architecture for residential Internet telephony service", IEEE Internet Computing May-Jun. 1999 vol. 3 Issue 3.

(Continued)

*Primary Examiner* — Fan Tsang
*Assistant Examiner* — Simon King
(74) *Attorney, Agent, or Firm* — Coats & Bennett, P.L.L.C.

(57) ABSTRACT

A method and a system which provide means to enable terminal equipment that relies on network based retrieval of data objects and terminal equipment that comprises data object retrieval capability, to coexist and interact with each other on the same communication network. This is accomplished by a filtering server on the network that at least knows which terminals require network based retrieval and only gives these terminals network based data object retrieval.

10 Claims, 8 Drawing Sheets

U.S. PATENT DOCUMENTS

| | | |
|---|---|---|
| 5,771,279 A | 6/1998 | Cheston, III et al. |
| 5,805,823 A | 9/1998 | Seitz |
| 5,812,667 A | 9/1998 | Miki et al. |
| 5,812,950 A | 9/1998 | Tom |
| 5,850,433 A | 12/1998 | Rondeau |
| 5,854,976 A | 12/1998 | Garcia Aguilera et al. |
| 5,878,347 A | 3/1999 | Joensuu et al. |
| 5,889,861 A | 3/1999 | Ohashi et al. |
| 5,893,031 A | 4/1999 | Hoogerwerf et al. |
| 5,895,471 A | 4/1999 | King et al. |
| 5,901,352 A | 5/1999 | St-Pierre et al. |
| 5,920,815 A | 7/1999 | Akhavan |
| 5,930,341 A * | 7/1999 | Cardillo et al. ............ 379/93.25 |
| 5,930,699 A | 7/1999 | Bhatia |
| 5,930,703 A | 7/1999 | Cairns |
| 5,933,486 A | 8/1999 | Norby et al. |
| 5,940,598 A | 8/1999 | Strauss et al. |
| 5,946,684 A | 8/1999 | Lund |
| 5,948,066 A | 9/1999 | Whalen et al. |
| 5,949,763 A | 9/1999 | Lund |
| 5,950,121 A | 9/1999 | Kaminsky et al. |
| 5,950,137 A | 9/1999 | Kim |
| 5,952,969 A | 9/1999 | Hagerman et al. |
| 5,963,626 A | 10/1999 | Nabkel |
| 5,970,414 A | 10/1999 | Bi et al. |
| 5,978,806 A | 11/1999 | Lund |
| 5,991,749 A | 11/1999 | Morrill, Jr. |
| 5,999,806 A | 12/1999 | Kaplan et al. |
| 6,002,749 A | 12/1999 | Hansen et al. |
| 6,005,870 A | 12/1999 | Leung et al. |
| 6,006,097 A | 12/1999 | Hornfeldt et al. |
| 6,006,251 A | 12/1999 | Toyouchi et al. |
| 6,009,091 A | 12/1999 | Stewart et al. |
| 6,014,090 A | 1/2000 | Rosen et al. |
| 6,016,349 A | 1/2000 | Musa |
| 6,018,654 A | 1/2000 | Valentine et al. |
| 6,028,914 A | 2/2000 | Lin et al. |
| 6,031,836 A | 2/2000 | Haserodt |
| 6,047,174 A | 4/2000 | Frederick |
| 6,049,713 A | 4/2000 | Tran et al. |
| 6,058,301 A | 5/2000 | Daniels |
| 6,058,310 A | 5/2000 | Tokuyoshi |
| 6,064,887 A | 5/2000 | Kallioniemi et al. |
| 6,067,546 A | 5/2000 | Lund |
| 6,072,875 A | 6/2000 | Tsudik |
| 6,075,993 A | 6/2000 | Kawamoto |
| 6,078,581 A | 6/2000 | Shtivelman et al. |
| 6,081,705 A | 6/2000 | Houde et al. |
| 6,088,587 A | 7/2000 | Abbadessa |
| 6,088,598 A | 7/2000 | Marsolais |
| 6,091,808 A | 7/2000 | Wood et al. |
| 6,091,945 A | 7/2000 | Oka |
| 6,091,946 A | 7/2000 | Ahvenainen |
| 6,094,168 A | 7/2000 | Duffett-Smith et al. |
| 6,097,793 A | 8/2000 | Jandel |
| 6,097,942 A | 8/2000 | Laiho |
| 6,112,078 A | 8/2000 | Sormunen et al. |
| 6,115,754 A | 9/2000 | Landgren |
| 6,134,450 A | 10/2000 | Nordeman |
| 6,138,158 A | 10/2000 | Boyle et al. |
| 6,141,413 A | 10/2000 | Waldner et al. |
| 6,154,646 A | 11/2000 | Tran et al. |
| 6,157,708 A | 12/2000 | Gordon |
| 6,157,841 A | 12/2000 | Bolduc et al. |
| 6,161,008 A | 12/2000 | Lee et al. |
| 6,161,134 A | 12/2000 | Wang et al. |
| 6,163,598 A | 12/2000 | Moore |
| 6,163,691 A | 12/2000 | Buettner et al. |
| 6,169,897 B1 | 1/2001 | Kariya |
| 6,173,316 B1 | 1/2001 | De Boor et al. |
| 6,175,741 B1 | 1/2001 | Alperovich |
| 6,181,928 B1 | 1/2001 | Moon |
| 6,181,935 B1 | 1/2001 | Gossman et al. |
| 6,185,184 B1 | 2/2001 | Mattaway et al. |
| 6,188,756 B1 | 2/2001 | Mashinsky |
| 6,188,909 B1 | 2/2001 | Alanara et al. |
| 6,192,123 B1 * | 2/2001 | Grunsted et al. ............ 379/350 |
| 6,192,251 B1 | 2/2001 | Jyogataki et al. |
| 6,192,258 B1 | 2/2001 | Kamada et al. |
| 6,199,099 B1 | 3/2001 | Gershman et al. |
| 6,202,023 B1 | 3/2001 | Hancock et al. |
| 6,205,204 B1 | 3/2001 | Morganstein et al. |
| 6,208,659 B1 | 3/2001 | Govindarajan et al. |
| 6,215,790 B1 | 4/2001 | Voit et al. |
| 6,219,413 B1 | 4/2001 | Burg |
| 6,219,694 B1 | 4/2001 | Lazaridis et al. |
| 6,219,696 B1 | 4/2001 | Wynblatt et al. |
| 6,226,367 B1 | 5/2001 | Smith et al. |
| 6,226,668 B1 | 5/2001 | Silverman |
| 6,233,234 B1 | 5/2001 | Curry et al. |
| 6,233,608 B1 | 5/2001 | Laursen et al. |
| 6,243,443 B1 | 6/2001 | Low et al. |
| 6,243,453 B1 | 6/2001 | Bunch et al. |
| 6,253,234 B1 | 6/2001 | Hunt et al. |
| 6,256,498 B1 | 7/2001 | Ludwig |
| 6,301,609 B1 | 10/2001 | Aravamudan et al. |
| 6,311,057 B1 | 10/2001 | Barvesten |
| 6,317,594 B1 | 11/2001 | Gossman et al. |
| 6,320,946 B1 | 11/2001 | Enzmann et al. |
| 6,327,355 B1 | 12/2001 | Britt |
| 6,353,660 B1 * | 3/2002 | Burger et al. ............... 379/88.17 |
| 6,356,956 B1 | 3/2002 | Deo et al. |
| 6,370,137 B1 | 4/2002 | Lund |
| 6,381,465 B1 | 4/2002 | Chern et al. |
| 6,411,704 B1 | 6/2002 | Pelletier et al. |
| 6,424,828 B1 | 7/2002 | Collins et al. |
| 6,469,998 B1 | 10/2002 | Burgaleta Salinas et al. |
| 6,470,447 B1 | 10/2002 | Lambert et al. |
| 6,480,883 B1 | 11/2002 | Tsutsumitake |
| 6,493,324 B1 * | 12/2002 | Truetken ........................ 370/261 |
| 6,496,579 B1 | 12/2002 | Mashinsky |
| 6,507,908 B1 | 1/2003 | Caronni |
| 6,522,875 B1 | 2/2003 | Dowling et al. |
| 6,542,489 B1 * | 4/2003 | Kari et al. ..................... 370/338 |
| 6,549,773 B1 | 4/2003 | Linden et al. |
| 6,560,456 B1 | 5/2003 | Lohtia et al. |
| 6,625,644 B1 | 9/2003 | Zaras |
| 6,640,240 B1 | 10/2003 | Hoffman et al. |
| 6,647,108 B1 | 11/2003 | Wurster et al. |
| 6,671,508 B1 | 12/2003 | Mitsuoka et al. |
| 6,671,522 B1 | 12/2003 | Beaudou |
| 6,687,340 B1 | 2/2004 | Goldberg et al. |
| 6,718,178 B1 | 4/2004 | Sladek et al. |
| 6,744,759 B1 | 6/2004 | Sidhu et al. |
| 6,792,607 B1 | 9/2004 | Burd et al. |
| 6,795,711 B1 | 9/2004 | Sivula |
| 6,798,868 B1 | 9/2004 | Montgomery et al. |
| 6,847,703 B2 * | 1/2005 | Shibuya ..................... 379/88.14 |
| 6,873,861 B2 | 3/2005 | Awada et al. |
| 6,889,321 B1 | 5/2005 | Kung et al. |
| 6,895,237 B1 | 5/2005 | Scott |
| 6,922,721 B1 * | 7/2005 | Minborg et al. .............. 709/219 |
| 6,937,597 B1 | 8/2005 | Rosenberg et al. |
| 6,959,193 B1 | 10/2005 | Kim |
| 6,965,666 B1 * | 11/2005 | Zhang ........................ 379/88.17 |
| 6,977,909 B2 * | 12/2005 | Minborg ........................ 370/260 |
| 6,978,005 B2 * | 12/2005 | Pernu et al. ..................... 379/229 |
| 6,983,138 B1 * | 1/2006 | Helferich ..................... 455/412.1 |
| 6,996,072 B1 * | 2/2006 | Minborg ........................ 370/260 |
| 7,058,686 B2 | 6/2006 | Jin |
| 7,110,525 B1 | 9/2006 | Heller et al. |
| 7,177,897 B2 | 2/2007 | Manukyan |
| 7,221,741 B1 | 5/2007 | Suder et al. |
| 7,237,004 B2 * | 6/2007 | Slobodin et al. .............. 709/204 |
| 7,248,862 B2 * | 7/2007 | Minborg et al. .............. 455/415 |
| 7,269,253 B1 | 9/2007 | Wu et al. |
| 7,409,701 B1 * | 8/2008 | Tiphane ........................ 725/105 |
| 2002/0022485 A1 * | 2/2002 | Kolsky et al. .................. 455/452 |
| 2002/0059272 A1 | 5/2002 | Porter |
| 2002/0068550 A1 | 6/2002 | Tejada |
| 2002/0128002 A1 | 9/2002 | Vu |
| 2003/0050052 A1 | 3/2003 | Minborg et al. |
| 2003/0060211 A1 | 3/2003 | Chern |
| 2003/0135586 A1 * | 7/2003 | Minborg et al. .............. 709/219 |
| 2003/0174684 A1 | 9/2003 | Pohjanvuori et al. |
| 2004/0236792 A1 | 11/2004 | Celik |
| 2005/0157858 A1 * | 7/2005 | Rajagopalan et al. ..... 379/93.23 |

| | | | |
|---|---|---|---|
| 2006/0276196 A1* | 12/2006 | Jiang et al. ............... | 455/446 |
| 2007/0293205 A1 | 12/2007 | Henderson | |
| 2008/0005695 A1* | 1/2008 | Ozzie et al. ............... | 715/811 |
| 2008/0119228 A1* | 5/2008 | Rao ........................... | 455/557 |
| 2009/0106380 A1* | 4/2009 | Asthana et al. ............ | 709/206 |

FOREIGN PATENT DOCUMENTS

| | | |
|---|---|---|
| EP | 0 484 067 | 5/1992 |
| EP | 0 851 647 | 7/1998 |
| EP | 0 853 287 | 7/1998 |
| EP | 0 858 202 | 8/1998 |
| EP | 0869688 A2 | 10/1998 |
| EP | 0 944 203 | 9/1999 |
| EP | 0 971 513 A2 | 1/2000 |
| EP | 1041808 A2 | 10/2000 |
| EP | 1 069 789 | 1/2001 |
| EP | 1 089 519 | 4/2001 |
| EP | 1 111 505 A1 | 6/2001 |
| EP | 1 128 647 A2 | 8/2001 |
| GB | 2 338 150 | 12/1999 |
| WO | WO 94/23523 | 10/1994 |
| WO | WO 97/07644 | 2/1997 |
| WO | WO 97/13380 | 4/1997 |
| WO | WO 97/20441 | 6/1997 |
| WO | WO 97/22211 | 6/1997 |
| WO | WO 97/22212 | 6/1997 |
| WO | WO 97/31490 | 8/1997 |
| WO | WO 97/31491 | 8/1997 |
| WO | WO 98/11744 | 3/1998 |
| WO | WO 98/18283 | 4/1998 |
| WO | WO 98/19445 | 7/1998 |
| WO | WO 98/56159 | 12/1998 |
| WO | WO 98/56197 | 12/1998 |
| WO | WO 99/00751 | 1/1999 |
| WO | WO 99/11078 | 3/1999 |
| WO | WO 99/35595 | 7/1999 |
| WO | 9953621 | 10/1999 |
| WO | WO 99/55107 | 10/1999 |
| WO | WO 00/04730 | 1/2000 |
| WO | WO 00/38458 | 6/2000 |
| WO | WO 00/39666 | 7/2000 |
| WO | WO 00/46697 | 8/2000 |
| WO | WO 0064110 A1 | 10/2000 |
| WO | WO 00/77662 | 12/2000 |
| WO | WO 0008016 | 12/2000 |
| WO | WO 01/01077 | 1/2001 |
| WO | WO 0105109 A1 | 1/2001 |
| WO | WO 01/20475 | 3/2001 |
| WO | WO 01/54373 | 7/2001 |
| WO | WO 0154364 A1 | 7/2001 |

OTHER PUBLICATIONS

Dalgic, et al., "True No. Portability and Advanced Call Screening in a SIP-Based IP Telephony System", IEEE Communications Magazine, p. 96-101, Jul. 1999.

* cited by examiner

METHOD AND APPARATUS FOR EXCHANGE OF DATA OBJECTS BETWEEN NETWORK NODES DEPENDING ON TERMINAL CAPABILITY

FIELD OF THE INVENTION

The present invention relates generally to a method and apparatus for exchanging information in a communication system. More specifically, the invention relates to a method and an apparatus which enables exchanging information such as phone pages between different types of terminals in a communication network such as a public or private telecommunication network.

BACKGROUND TO THE INVENTION

The present evolution of data-communication is such that more and more users gain access to the internet worldwide. Internet has become both a source of knowledge but also a market place for business, and it is attracting more and more users. Currently there is a high pressure on the data-communications industry to provide solutions that allow everyone to gain access to the internet. Broadband solutions are continuously developed and both local as well as national access networks are planned and launched. The presently most common method of modem access through the telecommunications network (e.g., the Public Switched Telecommunication Network, PSTN provider) is being replaced by other ways of access, with a possibility to higher data rates, e.g., through electric power lines or cable TV.

At the same time, the telecommunications industry is struggling another battle, that of providing mobility to each and every user. Traditionally, telecommunication has been focused on voice communication. With the increase of data communication however, other demands are arising (e.g., higher data rate transfer), but also new possibilities. Evolutions of mobile systems are presently in a period when more and more packet-based systems will be deployed.

The data-communication run over the telecommunications networks today is usually initiated by an access to an Internet- or a mail server. A user can dial a modem pool and is therefrom connected to a server, from which access can be made to both local as well as global networks. Browsers like e.g., Microsoft Explorer or Netscape Navigator are used to navigate on the internet and switch between internet pages or addresses. Users can design their own data objects, homepages, on an internal or external network that provides personal information or any other kind of information. Once connected to the data network a user may access these data objects by entering the correct address. The address is often selected by combining a node name in the network (e.g. server name) and an arbitrary text-string. Typically, it is not trivial to find a desired data object, since the text strings and server names are not obvious.

Addressing in a telecommunications network, e.g., when engaging in a voice or data communication is usually performed by entering a telephone number on a User Equipment (UE), like a mobile telephone or a terminal with a facsimile functionality. A telephone number is a, world-wide, unique addressing string. A calling party (A-party) dials the addressing string (B-number) to the called party (B-party). Dependent on what type of network the A-party is a subscriber on, the call request is routed through one or several public telecommunication networks to the correct addressee and the communication may begin. Other unique addressing strings are for example email addresses, IPv4 addresses, IPv6 addresses, and sip (session initiation protocol) addresses.

There has lately been a merger between the data object handling of the internet and the simplicity of use of telecommunication networks. This has evolved partly because there is a problem in the present way of accessing the internet for specific data objects due to the non-obvious way of addressing data objects, and partly by a desire of the telecommunications industry to provide a simpler way of accessing data objects from telecommunication terminals than having to dial a modem number where the user is left on her own to retrieve a desired homepage or data object. This merger has resulted in systems where an A-party can retrieve data objects, also called phonepages, by the use of a simple unique identifier of a B-party, such as a dialed B-party number, an internet address such as an email address, an IPv4 address, a sip address, or an IPv6 address. The systems that accomplish this simple data retrieval have either network functionality or terminal functionality for the data object retrieval. Unfortunately these systems are not compatible.

SUMMARY OF THE INVENTION

An object of the invention is to enable a system of coexistance on the same network of terminals/telephones of the client based data object retrieval type and of terminals/telephones of the network based data object retrieval type.

The aforementioned objects are also achieved according to the invention by a method of providing data objects to user communication applications or terminals of subscribers in connection with subscribers establishing communication events with other subscribers. This in a network comprising both subscribers with autonomous type user communication applications or terminals that comprise functionality for client based retrieval of data objects and also subscribers with network type user communication applications or terminals that rely on functionality in the network to provide for retrieval of data objects. According to the invention the method comprises a plurality of steps. In a first step a type of user communication application or terminal is associated with at least some subscribers of the network. In a second step, an occurrence of a triggering event indicating a communication event between two subscribers is determined. And in a third step upon determination of a triggering event, the network provides data object retrieval only to the subscribers with network type user communication applications or terminals.

The method can further suitably comprises the step of associating a user communication application or terminal capability with subscribers of the network and that the step of the network providing data object retrieval only to the subscribers with network user communication applications or terminals, provides data retrieval in view of an associated user communication application or terminal capability of the subscriber.

The method can suitably further comprises a number of steps. In a first additional step a functionality type of network is associating with at least one other network, if the other network comprises a functionality according to the first three steps. And in a second additional step determining if a subscriber involved in the communication event belongs to another network or not and if the subscriber belongs to another network, then determining if that network is associated with the functionality type of network, and if it is then letting that other network provide for the functionality according to the first three steps. Additionally the second additional step can alternatively determine if a subscriber involved in the communication event belongs to another network or not and if the subscriber belongs to another network, then determine if that network is associated with the functionality type of network, and if it is not, then the network is providing data object retrieval to the subscriber in question.

Advantageously the method can further comprise the step of only providing data objects of a text nature or of an audio nature to subscribers belonging to other networks.

In some versions of the invention the step of the network providing data object retrieval further comprises the steps of:
  requesting a phone page number service to determine a phone page web server;
  requesting a data object of the phone page web server;
  providing the data object received from the phone page web server to the subscriber in question.

In other versions of the invention the step of the network providing data object retrieval further comprises the steps of:
  requesting a data holder to provide a data object to the subscriber in question.

One or more of the features of the above-described different methods according to the invention can be combined in any desired manner, as long as the features are not contradictory.

The aforementioned objects are further achieved in accordance with the invention by a filtering server of a communication network arranged to provide data objects to user communication applications or terminals of subscribers in connection with subscribers establishing communication events with other subscribers. The communication network comprises both subscribers with autonomous type user communication applications or terminals that comprise functionality for client based retrieval of data objects and also subscribers with network type user communication applications or terminals that rely on functionality in the network to provide for retrieval of data objects. According to the invention the filtering server is arranged to associate a type of user communication application or terminal with subscribers of the network. The filtering server is further arranged to determine an occurrence of a triggering event indicating a communication event between two subscribers. And the filtering server is also arranged to upon determination of a triggering event, to provide data object retrieval only to the subscribers with network type user communication applications or terminals.

Different embodiments of the filtering server according to the invention can also be reached according to additional features mentioned above in connection with the description of the method according to the invention. The features of the above-described different embodiments of a filtering server according to the invention can be combined in any desired manner, as long as no conflict occurs.

The aforementioned objects are further achieved in accordance with the invention by a filtering server of a telecommunications network to provide data object retrieval to one or more subscribers of the telecommunications network. According to the invention the filtering server is arranged to intercept call set-up control for bearer channels between a caller and a callee. Further arranged to determine a caller and a caller profile. And also arranged to arrange for a callee data object to be made available to caller if the caller profile indicates filtering server retrieval of the callee data object. Further arranged to allow the caller to arrange for retrieval of the callee data object if the caller profile indicates caller retrieval of callee data object. Also arranged to determine the callee and if the callee is a subscriber of the telecommunications network. Also arranged to determine a callee profile if the callee is a subscriber of the telecommunications network. And arranged to arrange for a caller data object to be made available to the callee if the callee is a subscriber of the telecommunications network and if the caller profile indicates filtering server retrieval of caller data object. And finally arranged to allow the callee to arrange for retrieval of the caller data object if the callee is a subscriber of the telecommunications network and if the callee profile indicates callee retrieval of caller data object.

The invention provides many more advantages over prior art system, some more which will be disclosed in further detail below.

BRIEF DESCRIPTION OF THE DRAWINGS

The invention will now be more thoroughly described in more detail for explanatory, and in no sense limiting, purposes and features and advantages will become readily apparent by the following detailed description, where references will be made to the accompanying figures, where.

DETAILED DESCRIPTION

Figure 1:
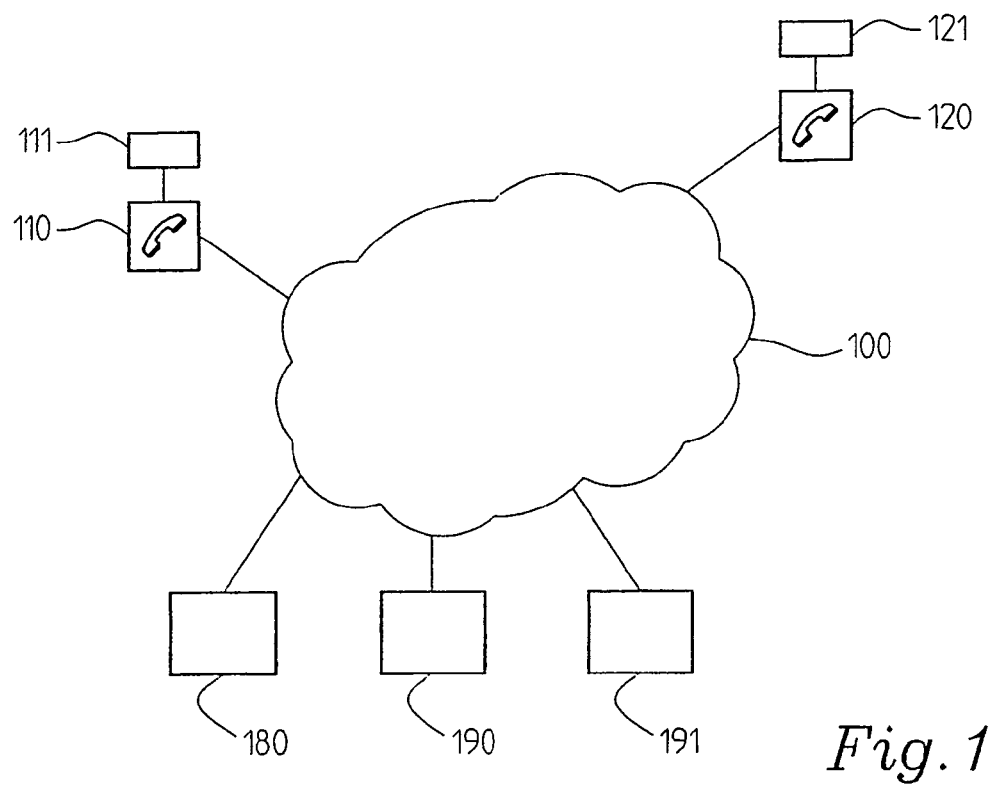
FIG. 1 illustrates a schematic overview of a system with network based data object/phone page retrieval.

The invention deals with the retrieval of data objects, or so called phone pages. The retrieval of data objects according to the invention is based on providing an association between address indications such as telephone numbers to a data object/phone page. A data object can also comprise an internet address pointing to another data object which is the desired phonepage. When a user dials a telephone number, an internet address associated with for example the telephone number, is automatically obtained and the content located at the internet address (i.e. the phonepage) is automatically downloaded and displayed on the user's telephone. At the same time, the user's own phonepage will be downloaded and displayed on the called paity's telephone. Besides being associated with a telephone number (possibly both the owner's and also the requester's, giving a possibility to send different phonepages in dependence of who is requesting/receiving them), a phonepage is also associated with a particular event. Examples of such events are when the user dials a telephone number, answers a call, receives an incoming call or when a dialed number is busy. A user can have several different phonepages, each associated with one or several events. This allows a user to provide different types of information to other users depending on the situation. One useful example is the possibility for a user to provide additional information (such as an e-mail address) if he or she is busy or does not answer. In short the data object retrieval according to the invention can be exemplified by:

- A phonepage event occurs, e.g. a user dials a number on a telephone, e.g. a mobile phone. The mobile phone automatically sends a request to a phonepage number server asking for the internet address (i.e. the location of the phonepage) associated with the dialed phone number.
- The phonepage number server uses the telephone number together with other parameters to look up the internet address in a database.
- When the mobile phone receives the location of the phonepage, a browser, or an equivalent functionality, is launched and a request to retrieve the information at the internet address is sent.
- The phonepage content is downloaded to the mobile terminal.

According to another aspect of data object/phone page retrieval according to the present invention a phonepage can be associated with an internet address such as an IPv6 address, sip address or an email address. For example, an A-party, upon setting up a communication link with a webpage to a thermostat of his or her summer house to thereby control/check the temperature, will receive a data object which, for example, identifies the thermostat and comprises a link to the manufacturers home page, and/or other communication means to the manufacturer. In another example, an A-party desires to set up a conference call by means of a conference telephone located in a conference room. Upon initiation of the communication, the A-party will receive a data object which is linked to the conference telephone by means of its telephone number, http address or IP address. The data object, the conference telephone's phonepage, can suitably comprise information concerning the locality of the conference phone, the size of the conference room, and/or a booking schedule. In still another example, an A-party desires to transfer a facsimile. Upon choosing or initiating transmission to a fax-machine, the phonepage of the fax machine is requested and returned to the A-party. A phonepage of a fax machine might comprise information concerning the locality of the fax, whose fax machine it is, and/or who has access to the fax machine. In still a further example, an A-party desires to transfer an email to a B-party. Then, upon choosing or writing the email address, i.e. perhaps even before a message is composed, the phonepage of the email address is requested and returned to the A-party. A phonepage of an email address might comprise information concerning the owner, the B-party user, of the email address, other means of communication with the owner, and/or schedule or availability of the owner. A phonepage is a data object that is linked to a unique identifier such as a telephone number or an internet address such as an IPv6 address, but not located or retrieved from the place that the unique identifier identifies.

Figure 2:
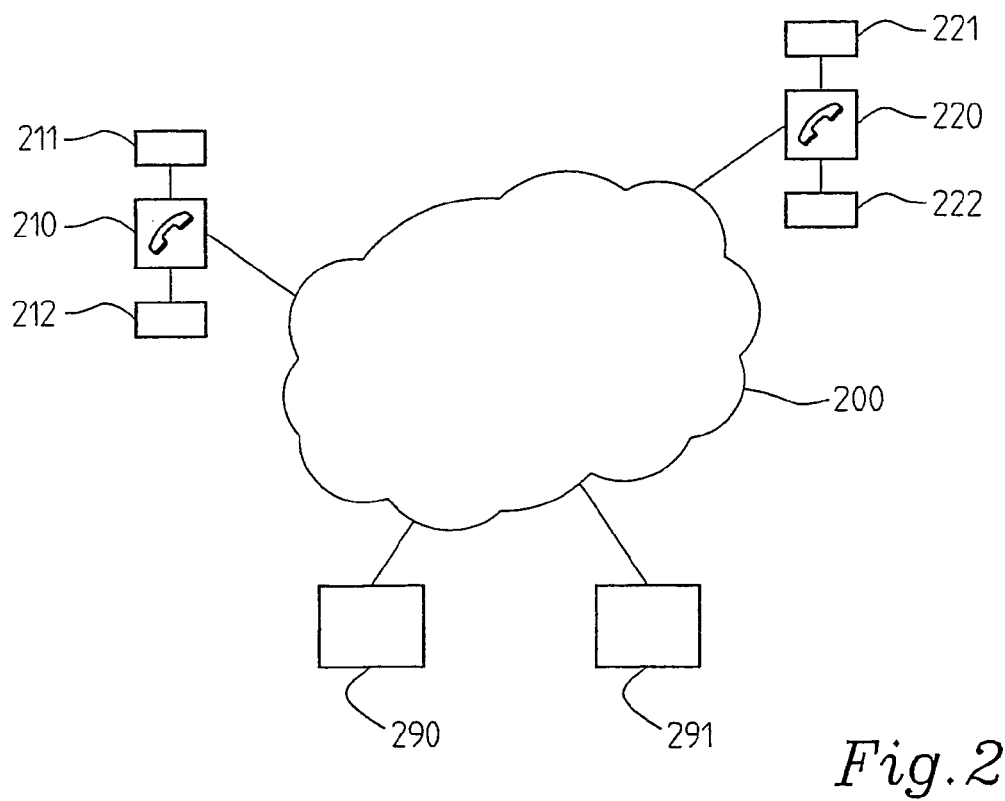
FIG. 2 illustrates a schematic overview of a system with terminal based data object/phone page retrieval.

In order to clarify the method and the system according to the invention, some examples of its use will now be described in connection with FIGS. 1 to 10. FIG. 1 and FIG. 2 disclose two different manners in which retrieval of data objects have been done. FIG. 1 discloses a network based data object retrieval method and FIG. 2 discloses a terminal based data object retrieval method FIG. 1 shows a schematic overview of a system with network based data object/phone page retrieval. In this system a communication network 100, such as a telecommunication network possibly including a data network, can establish a communication link between a first terminal/telephone 110 and a second terminal/telephone 120. Each terminal/telephone 110, 120 also comprises a data object/phone page interface 111, 121, to enable reception of and provide a user interface to data objects/phone pages. In a network based retrieval system, an application/server 180 for network based access is provided somewhere in the communication network 100. The application/server 180 for network based access will intercept events of the terminals 110, 120 that will invoke a request for a phone page. The application/server 180 for network based access will then request a phone page from a phone page number service (PNS) 190, which will either provide the location of the phone page at a phone page web server (PWS) 191 in which case the application/server 180 for network based access will request the phone page at the PWS 191, or the PNS 190 will directly request a phone page at the PWS 191 to be sent to the application/server 180 for network based access. The application/server 180 for network based access will then forward the phone page to the appropriate terminal/telephone 110, 120 to be accessed by a user via the user interface 111, 121.

For example, if a user at the first terminal 110 (A-party) dials the number to the second terminal 120 (B-party), then the application/server 180 for network based access is able to intercept the event of setting up a call from the first terminal 110 to the second terminal 120 as soon as it is visible in the communication network 100. The application/server 180 for network based access can then provide retrieval of the second terminal's 120 phone page to the first terminal 110, and provide retrieval of the first teminal's 110 phone page to the second terminal 120, by means of the PNS 190 and the PWS 191. A network based access will always provide phone page retrieval under predetermined circumstances, independently of the type of terminal.

FIG. 2 shows a schematic overview of a system with terminal based data object/phone page retrieval. As disclosed above, a first terminal/telephone 210 can be connected to a second terminal/telephone 220 via a communication network. In a system with terminal based data object/phone page retrieval, each terminal 210, 220 not only has to have a data object/phone page interface 211, 221 but also a terminal application 212, 222 for phone page retrieval. A terminal based data object retrieval system could be described as being more sensitive to events, since the events that trigger the retrieval of a data object only has to be visible within a terminal in question and not also be visible in the communication network as is the case of the network based data object retrieval system. A terminal based data object retrieval system will not need any network functionality for data object retrieval, but only a PNS 290, and a PWS 291.

For example, if a user looks in the phone book of a terminal 210, 220, the terminal application 212, 222 could be triggered by the event of a user looking at a name in the phone book for more than a set time. When the terminal application 212, 222 is triggered to retrieve the phone page of that person that corresponds to the name, it will first issue a PNS request to the PNS 290, and then possibly a PWS request to the PWS 291, if this is not done by the PNS 290, to thereby receive a phone page from the PWS 291. A terminal without a terminal application for phone page retrieval will not be able to get any phone pages in such a system.

Figure 3:
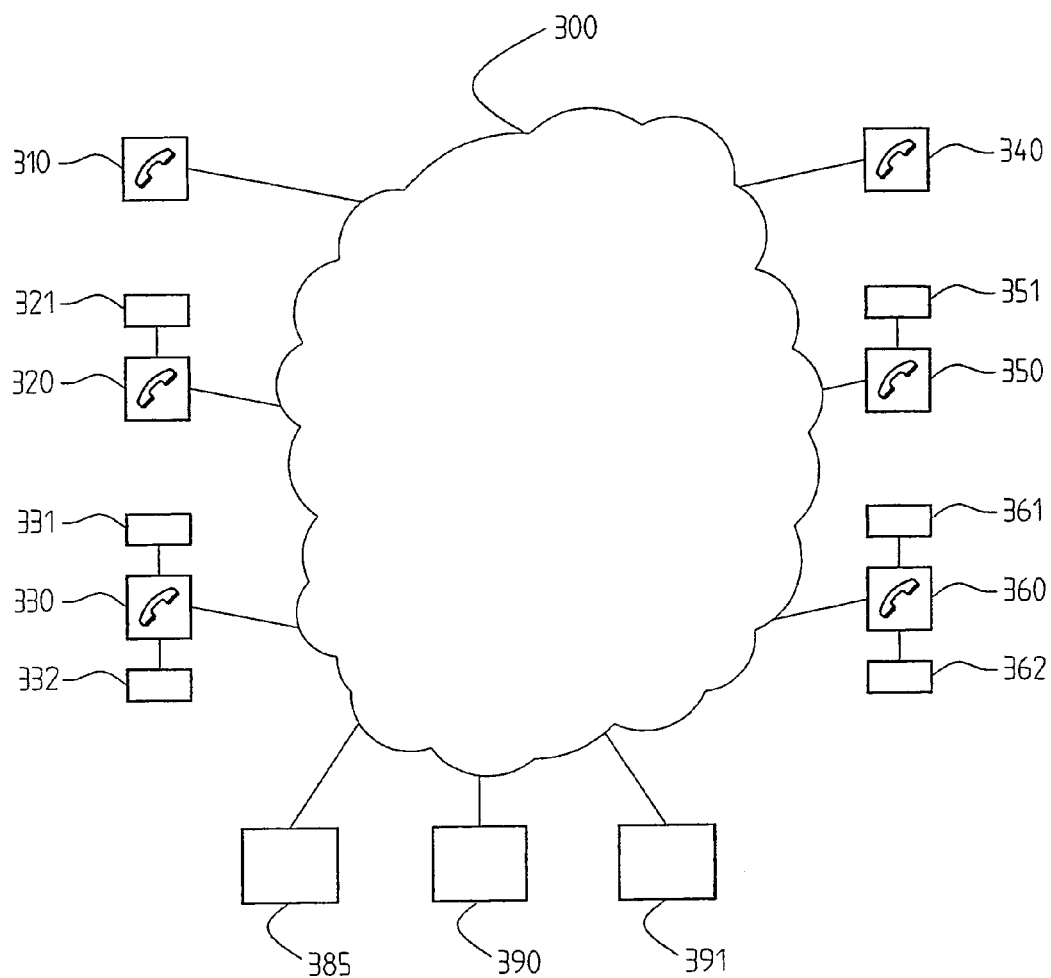
FIG. 3 illustrates a schematic overview of a system with multi-type data object/phone page retrieval according to the invention.

FIG. 3 shows a schematic overview of a system with multi-type data object/phone page retrieval according to the invention. The communication network 300 onto which terminals/telephones 310, 320, 330, 340, 350, 360 are connected can be of a similar type as those described above, with a PNS 390, and a PWS 391 hooked on as well. The communication network can be a telecommunications system based on GSM as a circuit switched communication system and/or GPRS as a packet switched communications system. It should however be noted that the embodiments described are to be considered exemplary and that other packet and/or circuit switched systems may equally well be considered for both data and voice communication. Voice communication, email communication, fax access, and HTTP downloading can be transported over circuit switched as well as packet switched systems. Both fixed as well as mobile circuit and packet switched systems with any suitable access technology, e.g., Time Division Multiple Access (TDMA), Code Division Multiple Access (CDMA), Frequency Division Multiple Access (FDMA), Orthogonal Frequency Division Multiple Access (OFDMA), Time Division Duplex (TDD), Frequency Division Duplex (FDD) or any combinations thereof can be used. The invention is not restricted to any specific type of communications network or access technology. The desired communication to be set-up can be either voice or data, e.g. to a facsimile or a data access to an IPv6 addressable device such as a thermostat. An A-party and a B-party can, for example, access and be accessed by a telephone number, an email address, an IPv4 address, a sip address, or an IPv6 address.

In a system according to the invention an A-party can be either a simple terminal/telephone 310, sometimes referred to as a plain old telephone (POT), a terminal/telephone 320 with only a data object interface 321, i.e. a terminal 320 intend to be connected to a network with network based data object retrieval, or a terminal 330 with both a data object interface 331 and a terminal application 332 for data object retrieval. A B-party can likewise be either a simple terminal/telephone 340, a terminal/telephone 350 with only a data object interface 351, i.e. a terminal 350 intend to be connected to a network with network based data object retrieval, or a terminal 360 with both a data object interface 361 and a terminal application 362 for data object retrieval. The terminals/telephones 310, 320, 330, 340, 350, 360 may for example be anything from plain old telephones with or without extra functionality, to different versions of mobile telephones, mobile telephones connected to any kind of data equipment, e.g., Personal Digital Assistance Devices (PDA) or Laptop computer, facsimile- or data modem devices, ISDN terminals or communication devices connected via a Digital Subscriber line (DSL)— (e.g. ADSL, HDSL and XDSL). Terminals/telephones, like mobile telephones, are today developed to handle both packet switched and circuit switched communication simultaneously. These are generally referred to as class A mobile terminals. Other mobile terminal design allows packet switched and circuit switched communication alternatively, i.e., no simultaneous packet switched and circuit switched transmission and reception. These are generally referred to as class B mobile terminals.

According to the invention a filtering server (FS) 385 is also connected to the communication network. The filtering server 385 makes sure that subscribers of the communication network 100 will get phone pages if desired, to their equipment, independently if it is of a simpler nature 310, 320, 340, 350 that relies on network based phone page retrieval or of a more advanced nature 330, 360 that comprises terminal based phone page retrieval. The filtering server 385 comprises at least a list of subscribers that desire network based phone page retrieval. If the filtering server 385 receives a triggering event, it will search to see if the originator of the triggering event is listed as a subscriber that desires network based phone page retrieval or not. If the subscriber is listed as a subscriber that desires network based phone page retrieval, then the filtering server 385 will provide the retrieval for the subscriber, otherwise not. In one version of the invention the filtering server 385 comprises a profile for subscribers that desire to be supported by the filtering server. The profile can for example also include the capabilities of the subscriber's terminal. The subscriber might only have a plain old telephone 310, 340 in which case the phone pages need to be converted to audio before being transferred to the subscriber. There might be other restrictions, such as graphic capabilities or a text only capability, such as SMS. Those subscribers that have terminal based phone page retrieval terminal equipment will provide for their own retrieval. This can be in a subscriber's profile at the filtering server, or if the subscriber is not listed at all, then the subscriber is left alone by the filtering server. The filtering server 385 or another unit on the network such as the PNS 390, can monitor terminal based phone page retrievals and thus provide the filtering server with the subscribers that have been monitored to have terminal based phone page retrieval.

Figure 4:
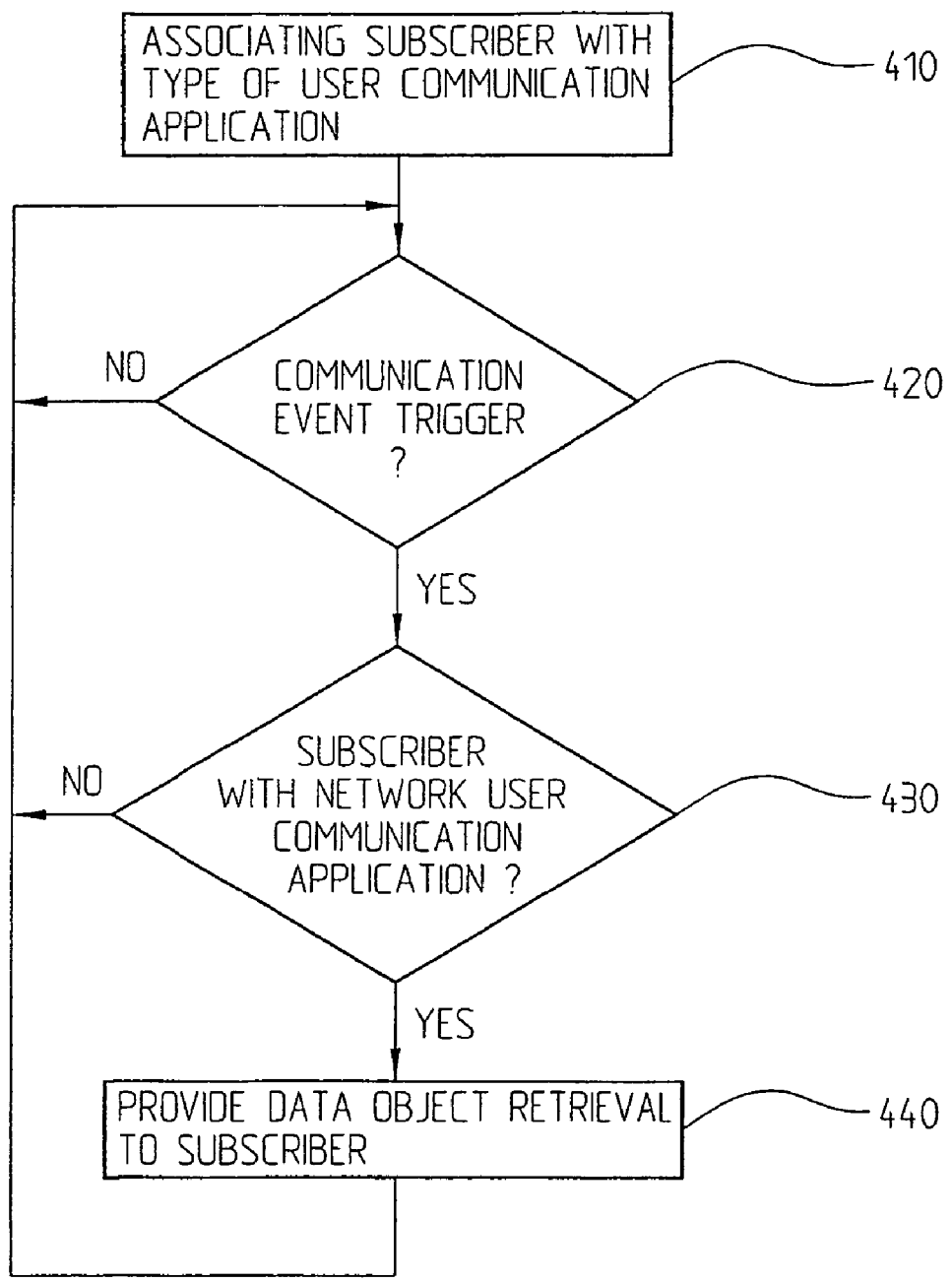
FIG. 4 illustrates a flow chart of a basic method of a filter server according to the invention.

FIG. 4 shows a flow chart of a basic method of a filter server according to the invention. In a first step 410 subscribers of the network are associated with a type of user communication application that their terminals have, typically none, network based or terminal based. To be noted, only subscribers that desire the assistance of the filtering server need to be associated with a type of user communication application that their terminals have. Then in a second step 420 it is determined if there is a communication event trigger or not. If there is not, then the procedure waits until one is detected. If there is an event trigger, then in a third step 430 it is determined if a subscriber involved with the communication event trigger is associated with a network user communication application or not. If the subscriber in question is associated with a network user communication application then in a fourth step 440 data object retrieval is provided to the terminal of the subscriber. In some versions, also those subscribers with no user communication application will be supported if desired, however, the data object will have to be adapted before it is provided to the terminal of the subscriber.

Figure 5:
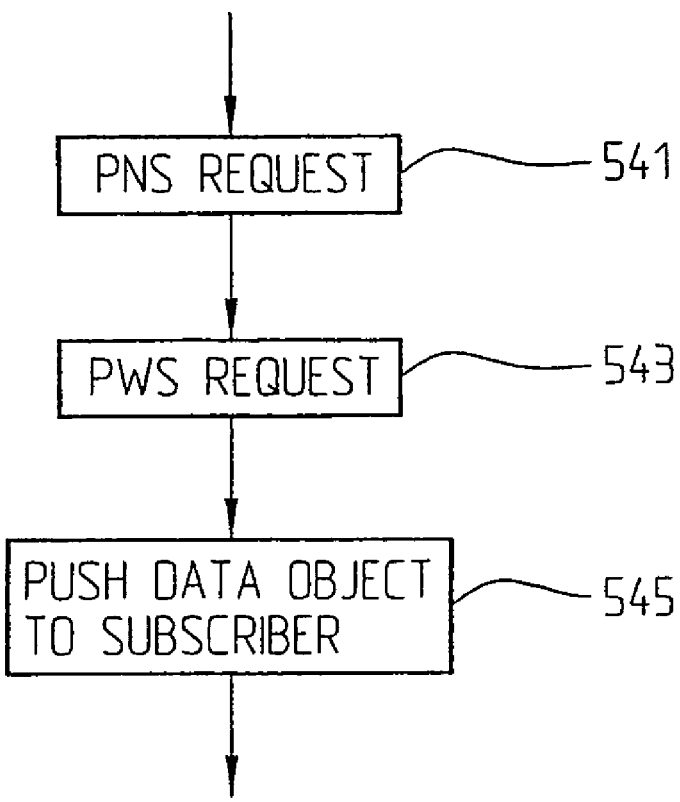
FIG. 5 illustrates a flow chart of a first method of making a data object available to a subscriber according to the invention, being a possible extension of the fourth step of FIG. 4.

FIG. 5 shows a flow chart of a first method of making a data object available to a terminal of a subscriber according to the invention, this is suitably an extension of the fourth step 440 of FIG. 4. In a first substep 541 of the fourth step 440 a PNS request is made. Then in a second substep 543 a PWS request is made. And finally in a third substep 545 a data object is pushed to the terminal of the subscriber by PWS or PNS.

Figure 6:
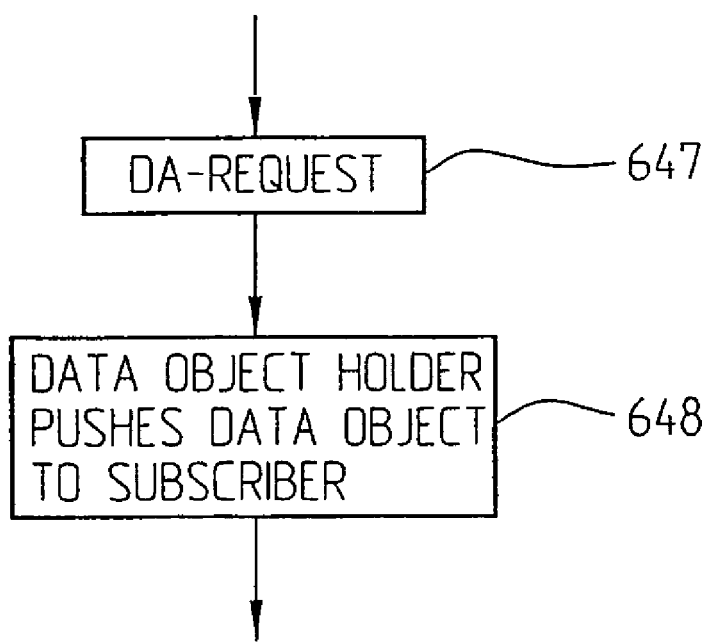
FIG. 6 illustrates a flow chart of a second method of making a data object available to a subscriber according to the invention, being a possible extension of the fourth step of FIG. 4.

In an enhancement of the invention, a method called direct access (DA) may be used for retrieval of a data object. FIG. 6 shows a flow chart of a second method of making a data object available to a subscriber according to the invention using direct access. This method is suitably also an extension of the fourth step 440 of FIG. 4. In a first substep 647 of the fourth step 440 a direct access (DA) request is made. Then in a second substep 648 a data holder to which the direct access was made pushes a data object directly to a terminal of the subscriber. A data holder is provided with all the information needed to directly provide a subscriber with a correct phone page.

Figure 7A:
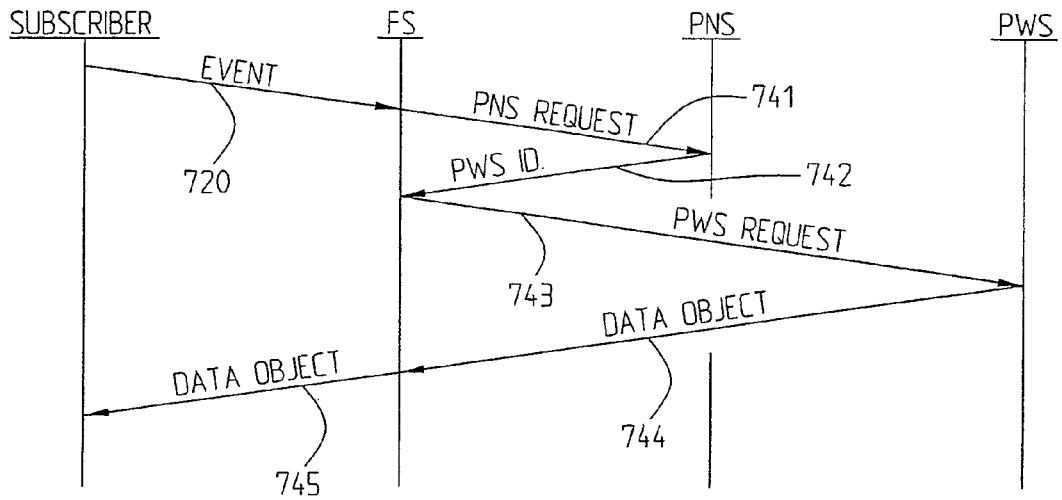
FIG. 7A illustrates a first version event graph of the flow chart according to FIG. 5, between a subscriber, a filter server, a PNS, and a PWS.
Figure 7B:
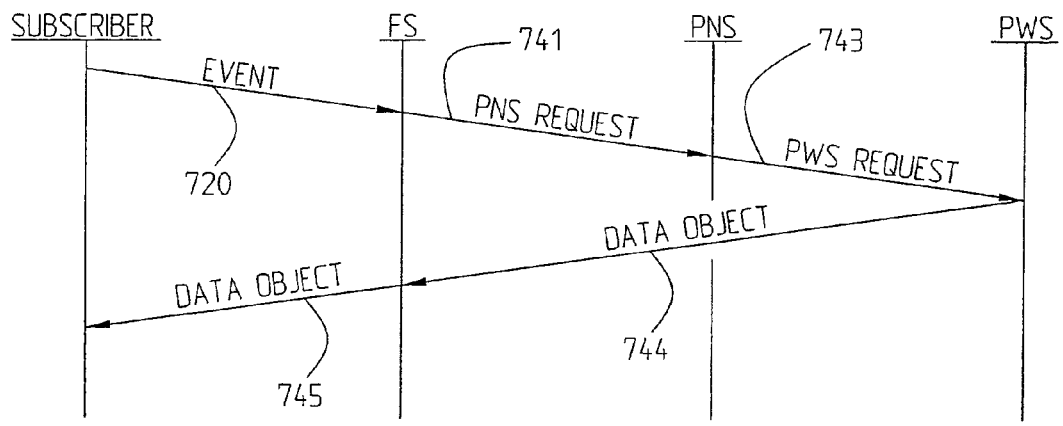
FIG. 7B illustrates a second version event graph of the flow chart according to FIG. 5, between a subscriber, a filter server, a PNS, and a PWS.
Figure 8:
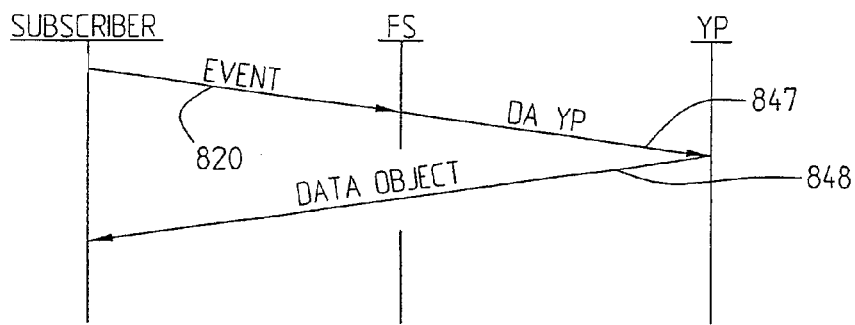
FIG. 8 illustrates a version of an event graph of the flow chart according to FIG. 6, between a subscriber, a filter server, and a yellow pages server/provider.

To clarify the different methods FIGS. 7A, 7B and FIG. 8 will illustrate event graphs of the methods of making a data object available. FIG. 7A shows a first version event graph of the flow chart according to FIG. 5, between a subscriber, a filter server (FS), a PNS, and a PWS. In a first event 720 initiated by a subscriber, a communication event trigger is supplied to the FS. The first event 720 corresponds to the second step 420 of FIG. 4. In a second event 741 at the FS in response to the first event, a PNS request is supplied to the PNS. The second event 741 corresponds to the first substep 541 of FIG. 5. Then in a third event 742 at the PNS in response to the second event, the PNS supplies a PWS identity and address to the FS. Thereafter in a fourth event 743 at the FS in response to the third event, a PWS request is supplied to the PWS. The fourth event 743 corresponds to the second substep 543 of FIG. 5. Then at a fifth event 744 at the PWS in response to the fourth event, a data object is supplied to the FS. And finally at a sixth event 745 at the FS in response to the fifth event, the data object is pushed to a terminal of the subscriber directly or via a another node such as a WAP gateway. The sixth event 745 corresponds to the third substep of FIG. 5. In some versions, the PWS may push the data object to the subscriber either directly or via another node such as a WAP gateway.

FIG. 7B shows a second version event graph of the flow chart according to FIG. 5, between a subscriber, a filter server, a PNS, and a PWS. In a first event 720 initiated by a subscriber, a communication event trigger is supplied to the FS. The first event 720 corresponds to the second step 420 of FIG. 4. In a second event 741 at the FS in response to the first event, a PNS request is supplied to the PNS. The second event 741 corresponds to the first substep 541 of FIG. 5. Then in a third event 743 at the PNS in response to the third event, a PWS request is supplied to the PWS. The third event 743 corresponds to the second substep of FIG. 5. Then in a fourth event 744 at the PWS in response to the third event, a data object is supplied to the FS. And finally in a fifth event 745 at the FS in response to the fourth event, the data object is pushed to the subscriber directly or via another node such as a WAP gateway. The fifth event 745 corresponds to the third substep 545 of FIG. 5. In some versions, the PWS may push the data object to the subscriber either directly or via another node such as a WAP gateway.

FIG. 8 shows a version of an event graph of the flow chart according to FIG. 6, between a subscriber, a filter server, and as an example a yellow or white pages server/provider as a data object holder. In a first event 820 caused by a subscriber, a communication event trigger is supplied to the FS. The first event 820 corresponds to the second step 420 of FIG. 4. Then in a second event 847 at the FS in response to the first event, a direct access (DA) yellow pages (YP) request is supplied to the YP. The second event corresponds to the first substep 647 of FIG. 6. And finally in a third event 848 at the YP in response to the second event, the data object is pushed to the subscriber. The third event 848 corresponds to the second substep 648 of FIG. 6.

Figure 9:
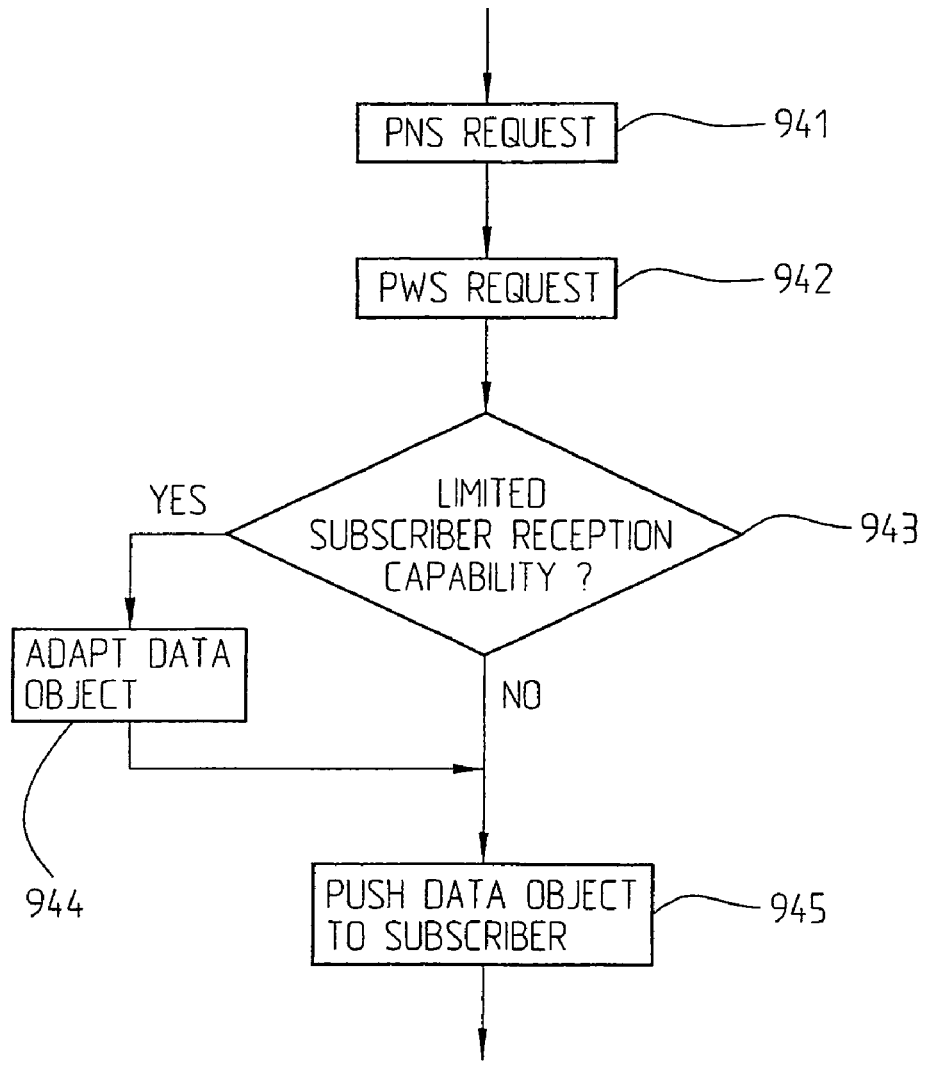
FIG. 9 illustrates a flow chart of an alternative method of making a data object available to a subscriber according to the invention, being a possible extension of the fourth step of FIG. 4.

FIG. 9 shows a flow chart of an alternative method of making a data object available to a subscriber according to the invention, the subscribers having different reception capabilities, which can be that a terminal can only receive sound, or possibly only text. These differences are suitably noted in association to the profile of each subscriber. The method is a possible extension of the fourth step 440 of FIG. 4. In a first substep 941 a PNS request is made. Then in a second substep 942 a PWS request is made. Thereafter in a third substep 943 it is determined if the subscriber has a limited subscriber reception capability, i.e. is, for example, reception limited to SMS. If the subscriber is noted as having a limited reception capability, then in a fourth substep 944 the data object is adapted to suit the limited reception capability of the subscriber. This adaptation can for example be to audio for a plain old telephone. Thereafter the adapted data object is pushed to the subscriber in a fifth substep 945. On the other hand, if there is no limitation to the reception capability, then the data object is pushed to the subscriber in the fifth substep 945 without any adaptation of it. This adaptation can either be performed by the FS, the PWS or the PNS.

Figure 10:
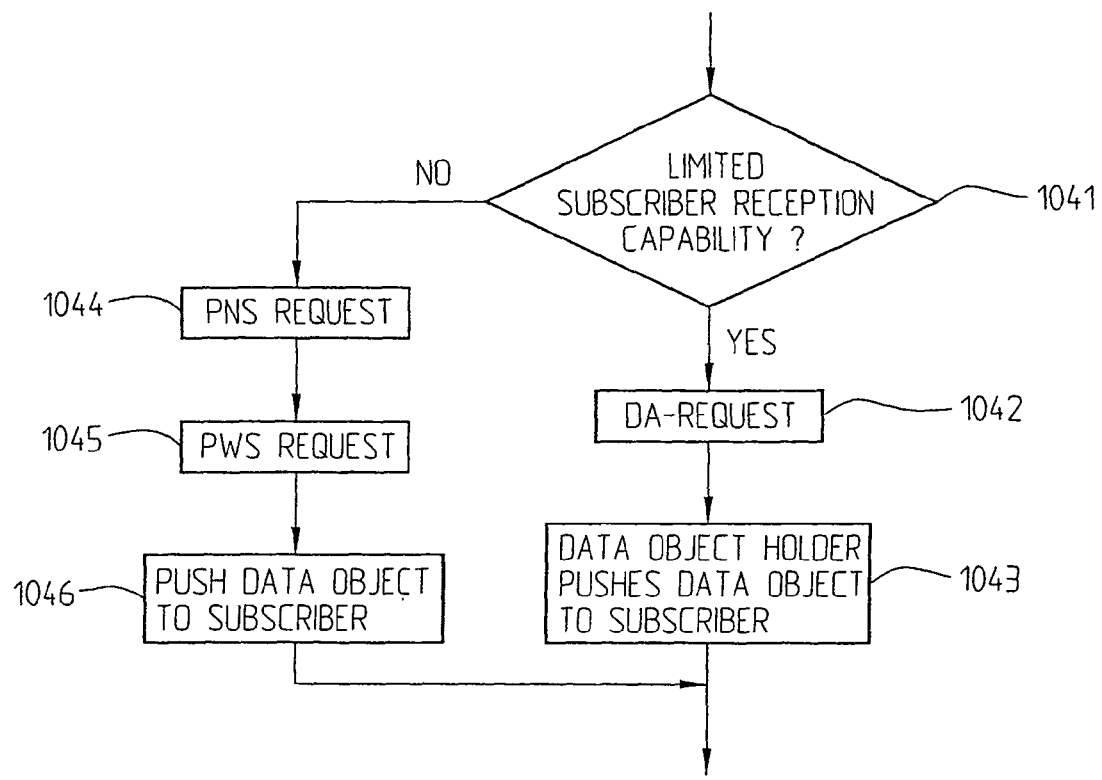
FIG. 10 illustrates a flow chart of an still another alternative method of making a data object available to a subscriber according to the invention, being a possible extension of the fourth step of FIG. 4.

Catering to different terminals/telephones with different capabilities can be solved in different ways. An alternative method according to the invention is to collect data objects at different sources to thereby provide for, for example, a distinction between text based and graphic based data objects. This can in some situations be favorable in comparison to having to try and adapt a data object/phone page. This method also allows a subscriber to indicate that he or she only desires phone pages from a specific source. Sometimes a user might only benefit from a simpler data object since data transmission to the terminal is limited. FIG. 10 shows a flow chart of this method which is a still another alternative method of making a data object available to a subscriber according to the invention. This method is also a possible extension of the fourth step 440 of FIG. 4. In a first substep 1041 it is determined if the subscriber is noted as having a limited subscriber reception capability, i.e. is, for example, reception limited to SMS, or if the subscriber desires, or has a preference, of having a data object retrieved from a particular source. If the subscriber is noted as having a limited reception capability or a specific desire for a simpler or particularly sourced data object, then the procedure continues with a second substep 1042 which make a DA request. Then in a third substep 1043 a data holder pushes a data object to a terminal of the subscriber. On the other hand, if the subscriber is not noted as having a limited reception capability, then the procedure continues with a fourth substep 1044 which makes a PNS request. Then in a fifth substep 1045 a PWS request is made. And finally in a sixth substep 1046 the data object is pushed to a terminal of the subscriber.

Figure 11:
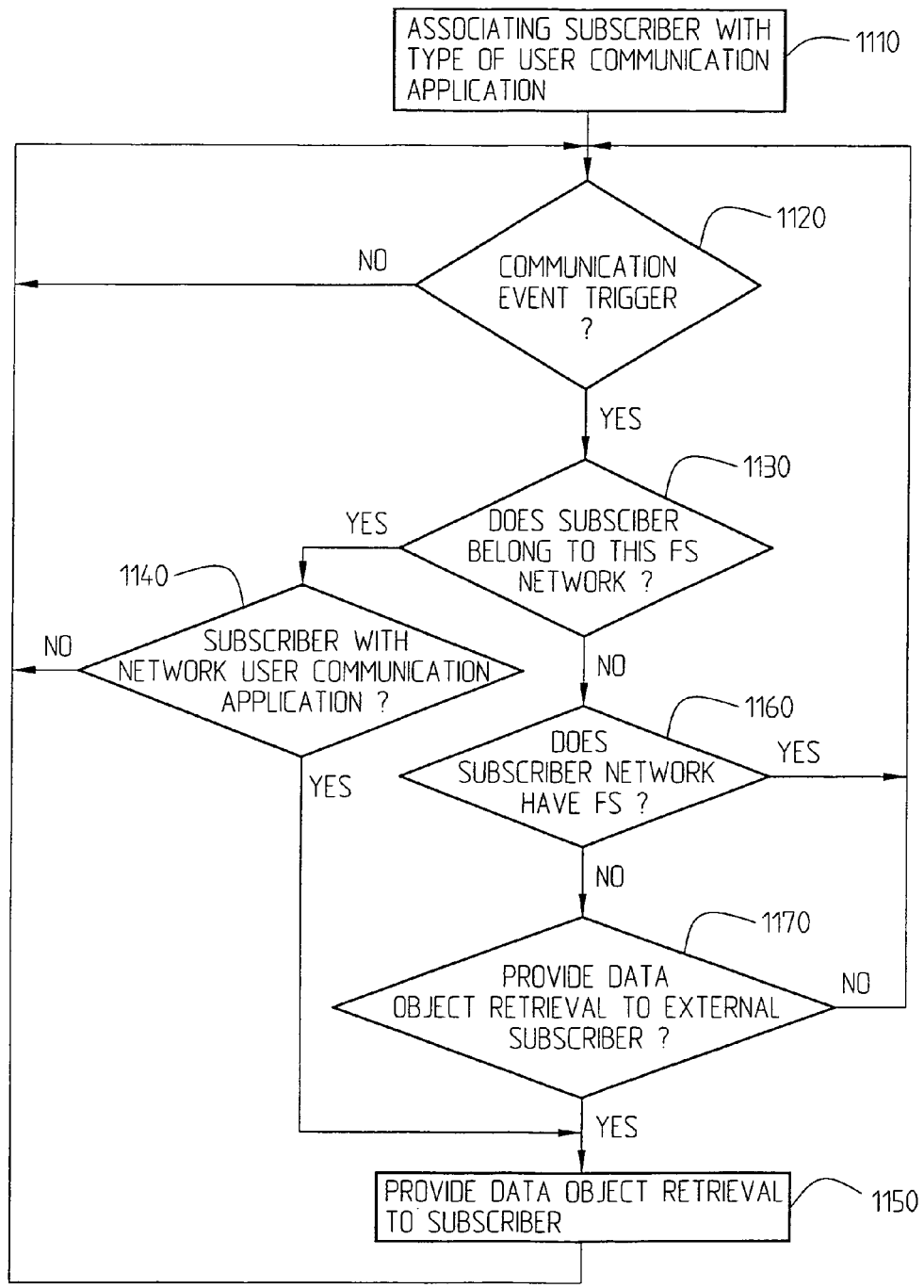
FIG. 11 illustrates a flow chart of a basic method of a filter server according to the invention.

FIG. 11 shows a flow chart of another basic method of a filter server according to the invention. This method involves the possibility that a subscriber might not belong to the capture area, i.e. the subscriber belongs to a different network for example. It is then possible in some versions of the invention that the filtering server is aware of, i.e. has a list of, which other network have filtering servers. Subscribers belonging to networks that have a filtering server will be supported by their own filtering server. Subscribers belonging to networks without a filtering server can be supported by another filtering server, i.e. the filtering server of the network that a subscriber with whom contact is made. This decision for support of external subscribers can for example be based on the unique identifier, such as the telephone number which might give some indication of terminal capability, i.e. to see if it is a mobile telephone which most likely has SMS support at least. In some version there will never be given support to external subscribers, and in some version support will be given but only in the form of audio, which most likely at least all telephones will be compatible with. In a first step 1110 subscribers of the network of this FS are associated with a type of user communication application, typically none, network based or terminal based. This will suitably only be performed once and then updated as new subscribers are added and when the characteristics of a subscriber changes. In a second step 1120 it is determined if there is a communication event trigger or not. If there is none, then the procedure will wait here, otherwise the procedure will continue with a third step 1130. The third step 1130 determines if a subscriber involved with the communication event trigger belongs to the network of this FS or not. If the subscriber in question belongs to this FS then in a fourth step 1140 it is determined if the subscriber is noted to be equipped with a network user communication application or not. If the subscriber is noted to be equipped with a network user communication application then in a fifth step 1150 a data object retrieval is provided to the subscriber after which the procedure continues with the second step 1120, otherwise the procedure directly returns to the second step 1120. If in the third step 1130 it was determined that the subscriber did not belong to this FS, then the procedure continues with a sixth step 1160. The sixth step 1160 determines if the network of the external subscriber has an FS or the equivalent functionality, or if it cannot be determined if the network of the external subscriber has an FS or not. If the subscriber network has an FS then the procedure continues with the second step 1120. If the subscriber network does not have an FS or if it cannot be determined if the network of the external subscriber has an FS or not, then the procedure continues with a seventh step 1170. The seventh step 1170 determines if a data object retrieval should be provided to external subscriber or not. This determination can for example be based on the type of network that the subscriber belongs to and/or if and how the subscriber in question is listed in a PNS or not. If the network that the subscriber in question belongs to is an advanced intelligent network (AIN) then there could be a possibility that the network provides network based access, and if the subscriber is in a PNS this could be an indication that the subscriber in question has terminal based retrieval. If it is determined that a data object retrieval should be provided, then the procedure continues with the fifth step 1150, otherwise the procedure continues with the second step 1120.

The present invention can be put into apparatus-form either as pure hardware, as pure software or as a combination of hardware and software. If the method according to the invention is realized in the form of software, it can be completely independent or it can be one part of a larger program. The software can suitably be located in a general-purpose computer or in a dedicated computer. The FS and one PNS can for example be one physical entity, or the FS, one PNS and one PWS can be in one physical entity, or the FS and one or more of PNS:s and PWS:s are physically separate units.

As a summary, the invention can basically be described as a method and a system which provide means to enable terminal equipment that relies on network based retrieval of data objects and terminal equipment that comprises data object retrieval capability, to coexist and interact with each other on the same communication network. This is accomplished by a filtering server on the network that at least knows which terminals require network based retrieval and only gives these terminals network based data object retrieval. The invention is not limited to the embodiments described above but may be varied within the scope of the appended patent claims.

FIG. 1 a schematic overview of a system with network based data object/phone page retrieval,
100 communication network,
110 a first terminal/telephone,
111 data object/phone page interface of first terminal/telephone,
120 a second terminal/telephone,
121 data object/phone page interface of second terminal/telephone,
180 application/server for network based access,
190 PNS—PhonePage Number Service which handles phonepage requests, possibly retrieval of concerned phonepage, and optionally downloading of the information to the involved terminals,
191 PWS—PhonePage Web Servers where phonepages are stored and managed.
FIG. 2 a schematic overview of a system with terminal based data object/phone page retrieval,
200 communication network,
210 a first terminal/telephone,
211 data object/phone page interface of first terminal/telephone,
212 terminal application of first terminal/telephone for phone page retrieval,
220 a second terminal/telephone,
221 data object/phone page interface of second terminal/telephone,
222 terminal application of second terminal/telephone for phone page retrieval,
290 PNS—PhonePage Number Service which handles phonepage requests, possibly retrieval of concerned phonepage, and optionally downloading of the information to the involved terminals,
291 PWS—PhonePage Web Servers where phonepages are stored and managed.
FIG. 3 a schematic overview of a system with multi-type data object/phone page retrieval according to the invention,
300 communication network,
310 a first terminal/telephone,
320 a second terminal/telephone,
321 data object/phone page interface of second terminal/telephone,
330 a third terminal/telephone,
331 data object/phone page interface of third terminal/telephone,
332 terminal application of third terminal/telephone for phone page retrieval,
340 a fourth terminal/telephone,
350 a fifth terminal/telephone,
351 data object/phone page interface of fifth terminal/telephone,
360 a sixth terminal/telephone,
361 data object/phone page interface of sixth terminal/telephone,
362 terminal application of sixth terminal/telephone for phone page retrieval,
385 FS—filtering server according to the invention, keeps track of different types of terminals in the network
390 PNS—PhonePage Number Service which handles phonepage requests, possibly retrieval of concerned phonepage, and optionally downloading of the information to the involved terminals,
391 PWS—PhonePage Web Servers where phonepages are stored and managed.
FIG. 4 a flow chart of a basic method of a filter server according to the invention,
410 a first step of associating subscribers of the network with a type of user communication application, typically none, network based or terminal based,
420 from the first step, or from the fourth step, or no from the second step, or no from the third step: a second step, which determines if there is a communication event trigger or not, 430 yes from the second step: a third step, which determines if a subscriber involved with the communication event trigger is with a network user communication application or not,
440 yes from the third step: a fourth step, which provides data object retrieval to subscriber with a network user communication application,
FIG. 5 a flow chart of a first method of making a data object available to a subscriber according to the invention, being a possible extension of the fourth step of FIG. 4,
541 a first substep making a PNS request,
543 from the first substep: a second substep, which makes a PWS request,
545 from the second substep: a third substep, in which a data object is pushed to subscriber.
FIG. 6 a flow chart of a second method of making a data object available to a subscriber according to the invention, being a possible extension of the fourth step of FIG. 4,
647 a first substep making a DA request,
648 from the first substep: a second substep, in which a data holder pushes data object to subscriber.
FIG. 7A a first version event graph of the flow chart according to FIG. 5, between a subscriber, a filter server, a PNS, and a PWS,
720 a first event caused by a subscriber, of the second step according to FIG. 4, a communication event trigger is supplied to the FS,
741 a second event at the FS in response to the first event, of the first substep of FIG. 5, a PNS request is supplied to the PNS,
742 a third event at the PNS in response to the second event, the PNS supplies a PWS identity to the FS,
743 a fourth event at the FS in response to the third event, of the second substep of FIG. 5, a PWS request is supplied to the PWS,
744 a fifth event at the PWS in response to the fourth event, a data object is supplied to the FS,
745 a sixth event at the FS in response to the fifth event, of the third substep of FIG. 5, the data object is pushed to the subscriber.
FIG. 7B a second version event graph of the flow chart according to FIG. 5, between a subscriber, a filter server, a PNS, and a PWS,
720 a first event caused by a subscriber, of the second step according to FIG. 4, a communication event trigger is supplied to the FS,
741 a second event at the FS in response to the first event, of the first substep of FIG. 5, a PNS request is supplied to the PNS,
743 a third event at the PNS in response to the second event, of the second substep of FIG. 5, a PWS request is supplied to the PWS,
744 a fourth event at the PWS in response to the third event, a data object is supplied to the FS,
745 a fifth event at the FS in response to the fourth event, of the third substep of FIG. 5, the data object is pushed to the subscriber.
FIG. 8 a version of an event graph of the flow chart according to FIG. 6, between a subscriber, a filter server, and a yellow pages server/provider,
820 a first event caused by a subscriber, of the second step according to FIG. 4, a communication event trigger is supplied to the FS,
847 a second event at the FS in response to the first event, of the first substep of FIG. 6, a DA YP request is supplied to the YP,
848 a third event at the YP in response to the second event, of the second substep of FIG. 6, the data object is pushed to the subscriber.
FIG. 9 a flow chart of an alternative method of making a data object available to a subscriber according to the invention, being a possible extension of the fourth step of FIG. 4,
941 a first substep making a PNS request,
942 from the first substep: a second substep, which makes a PWS request,
943 from the second substep: a third substep, which determines if the subscriber has a limited subscriber reception capability, i.e. is, for example, reception limited to SMS,
944 yes from the third substep: a fourth substep, which adapts the data object to suit the limited reception capability of the subscriber,
945 from the fourth substep, no from the third substep: a fifth substep, in which the data object is pushed to subscriber.
FIG. 10 a flow chart of an still another alternative method of making a data object available to a subscriber according to the invention, being a possible extension of the fourth step of FIG. 4,
1041 a first substep, which determines if the subscriber has a limited subscriber reception capability, i.e. is, for example, reception limited to SMS,
1042 yes from the first substep: a second substep making a DA request,
1043 from the second substep: a third substep, in which a data holder pushes data object to subscriber,
1044 no from the first substep: a fourth substep making a PNS request,
1045 from the fourth substep: a fifth substep, which makes a PWS request,
1046 from the fifth substep: a sixth substep, in which the data object is pushed to subscriber.
FIG. 11 a flow chart of a basic method of a filter server according to the invention,
1110 a first step of associating subscribers of the network of this FS with a type of user communication application, typically none, network based or terminal based,
1120 from the first step, or from the fifth step, or no from the second step, or no from the fourth step, or yes from the sixth step, or no from the seventh step: a second step, which determines if there is a communication event trigger or not,
1130 yes from the second step: a third step, which determines if a subscriber involved with the communication event trigger belongs to the network of this FS or not,
1140 yes from the third step: a fourth step, which determines if a subscriber of this FS involved with the communication event trigger is with a network user communication application or not,
1150 yes from the fourth step, or yes from the seventh step: a fifth step, which provides data object retrieval to subscriber with a network user communication application,
1160 no from the third step: a sixth step, which determines if the network of the subscriber has an FS,
1170 no from the sixth step: a seventh step, which determines if data object retrieval should be provided to external subscriber or not.

What is claimed is:
1. A method of providing data objects to terminals of subscribers in a first telecommunications network having first subscribers with autonomous type terminals and second subscribers with network type terminals, wherein the autonomous type terminals comprise functionality for client-based retrieval of data objects and wherein the network type terminals rely on functionality in the network to provide for retrieval of data objects, the method comprising:

associating each of the first and second subscribers with the corresponding type of terminal;

determining occurrences of triggering events indicating communication events between subscribers; and upon determination of each triggering event, selectively providing data object retrieval only to subscribers associated with network type terminals.

2. The method according to claim 1, further comprising:

associating a terminal capability with at least one of the second subscribers; wherein providing data object retrieval only to subscribers associated with network type terminals comprises providing data retrieval in view of the associated terminal capabilities.

3. The method according to claim 1 or 2, further comprising:

determining whether a subscriber involved in a first communication event belongs to a second network and, if the subscriber belongs to the second network, then selectively letting the second network provide data object retrieval to the subscriber based on whether the second network provides data object retrieval for network type terminals.

4. The method according to claim 1 or 2, further comprising:

determining whether a subscriber involved in a first communication event belongs to a second network and if the subscriber belongs to the second network, then selectively providing data object retrieval to the subscriber based on whether the second network provides data object retrieval for network type terminals.

5. The method according to claim 4, further comprising:

only providing data objects of a text nature to subscribers belonging to the second network.

6. The method according to claim 4, further comprising:

only providing data objects of an audio nature to subscribers belonging to the second network.

7. The method according to claim 1, wherein providing data object retrieval comprises:

requesting a phone page number service to determine a phone page web server;

requesting a data object of the phone page web server; and providing the data object received from the phone page web server to a subscriber involved in a first communication event.

8. The method according to claim 1, wherein providing data object retrieval comprises:

requesting a data holder to provide a data object to a subscriber involved in a first communication event.

9. A filtering server of a communication network arranged to provide data objects to terminals of subscribers, the communication network having first subscribers with autonomous type terminals and second subscribers with network type terminals, wherein the autonomous type terminals comprise functionality for client-based retrieval of data objects and wherein the network type terminals rely on functionality in the network to provide for retrieval of data objects, wherein the filtering server is arranged to:

associate each of the first and second subscribers with the corresponding type of terminal;

determine occurrences of triggering events indicating communication events between subscribers; and upon determination of each triggering event, to provide data object retrieval only to subscribers associated with network type terminals.

10. The filtering server of claim 9, wherein said communication network comprises a telecommunications network, and wherein said filtering server is arranged to:

determine the occurrences of triggering events indicating communication events between subscribers by intercepting call set-up control for bearer channels between a caller and a callee;

associate the type of terminal with subscribers of the network by determining the callee and whether the callee is a subscriber of the telecommunications network, determining a callee profile if the callee is a subscriber of the telecommunications network, and determining a caller and a caller profile; and upon determination of each triggering event, to provide data object retrieval only to subscribers associated with network type terminals by:

arranging for a callee data object to be made available to caller if the caller profile indicates filtering server retrieval of the callee data object;

allowing the caller to arrange for retrieval of the callee data object if the caller profile indicates caller retrieval of callee data object;

arranging for a caller data object to be made available to the callee if the callee is a subscriber of the telecommunications network and if the caller profile indicates filtering server retrieval of caller data object; and allowing the callee to arrange for retrieval of the caller data object if the callee is a subscriber of the telecommunications network and if the callee profile indicates callee retrieval of caller data object.

* * * * *